(12) United States Patent
Herington

(10) Patent No.: US 8,060,610 B1
(45) Date of Patent: Nov. 15, 2011

(54) MULTIPLE SERVER WORKLOAD MANAGEMENT USING INSTANT CAPACITY PROCESSORS

(75) Inventor: Daniel E. Herington, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 11/261,298

(22) Filed: Oct. 28, 2005

(51) Int. Cl.
*G06F 15/173* (2006.01)

(52) U.S. Cl. ....... 709/226; 709/224; 705/7.22; 705/400; 718/104; 718/105

(58) Field of Classification Search .................. 709/226, 709/224; 705/7.22, 400; 718/104, 105
See application file for complete search history.

(56) References Cited

U.S. PATENT DOCUMENTS

| | | | |
|---|---|---|---|
| 6,460,140 B1 * | 10/2002 | Schoch et al. | 726/22 |
| 6,760,910 B2 * | 7/2004 | Eilert et al. | 718/104 |
| 6,986,137 B1 * | 1/2006 | King et al. | 718/104 |
| 7,140,020 B2 | 11/2006 | McCarthy et al. | |
| 7,171,668 B2 * | 1/2007 | Molloy et al. | 718/105 |
| 7,290,260 B2 * | 10/2007 | Miller | 718/104 |
| 7,444,398 B1 * | 10/2008 | Matthews | 709/224 |
| 2003/0115157 A1 * | 6/2003 | Circenis | 705/400 |
| 2006/0036894 A1 * | 2/2006 | Bauer et al. | 714/4 |

* cited by examiner

*Primary Examiner* — Yves Dalencourt
*Assistant Examiner* — Michael C Lai

(57) ABSTRACT

In one embodiment, a method for workload management using instant capacity (iCAP) processors comprises generating performance data related to workloads on multiple servers, determining processor resources appropriate for the workloads using the performance data, communicating a request from a first server to reallocate processor resources in response to the determining, deactivating at least one iCAP processor on a second server in response to the request, and activating at least one iCAP processor on the first server in conjunction with the deactivating.

19 Claims, 2 Drawing Sheets

MULTIPLE SERVER WORKLOAD MANAGEMENT USING INSTANT CAPACITY PROCESSORS

TECHNICAL FIELD

The present application is generally related to multi-system workload management using instant capacity (iCAP) processors.

BACKGROUND

Instant capacity (iCAP) purchasing of high-end computers provides customers flexibility to acquire high capacity computer systems without imposing the normal single large capital investment. Specifically, an iCAP customer only pays for active central processing units (CPUs) in a given system (plus maintenance fees) while a number of CPUs remain inactive. As the customer's computing requirements increase with time, the customer may activate one or several of the previously inactive CPUs. After activation, the customer is charged for the newly activated CPUs. Accordingly, an iCAP customer is able to flexibly scale the system's computing power as the customer's needs change.

DETAILED DESCRIPTION

Figure 1:
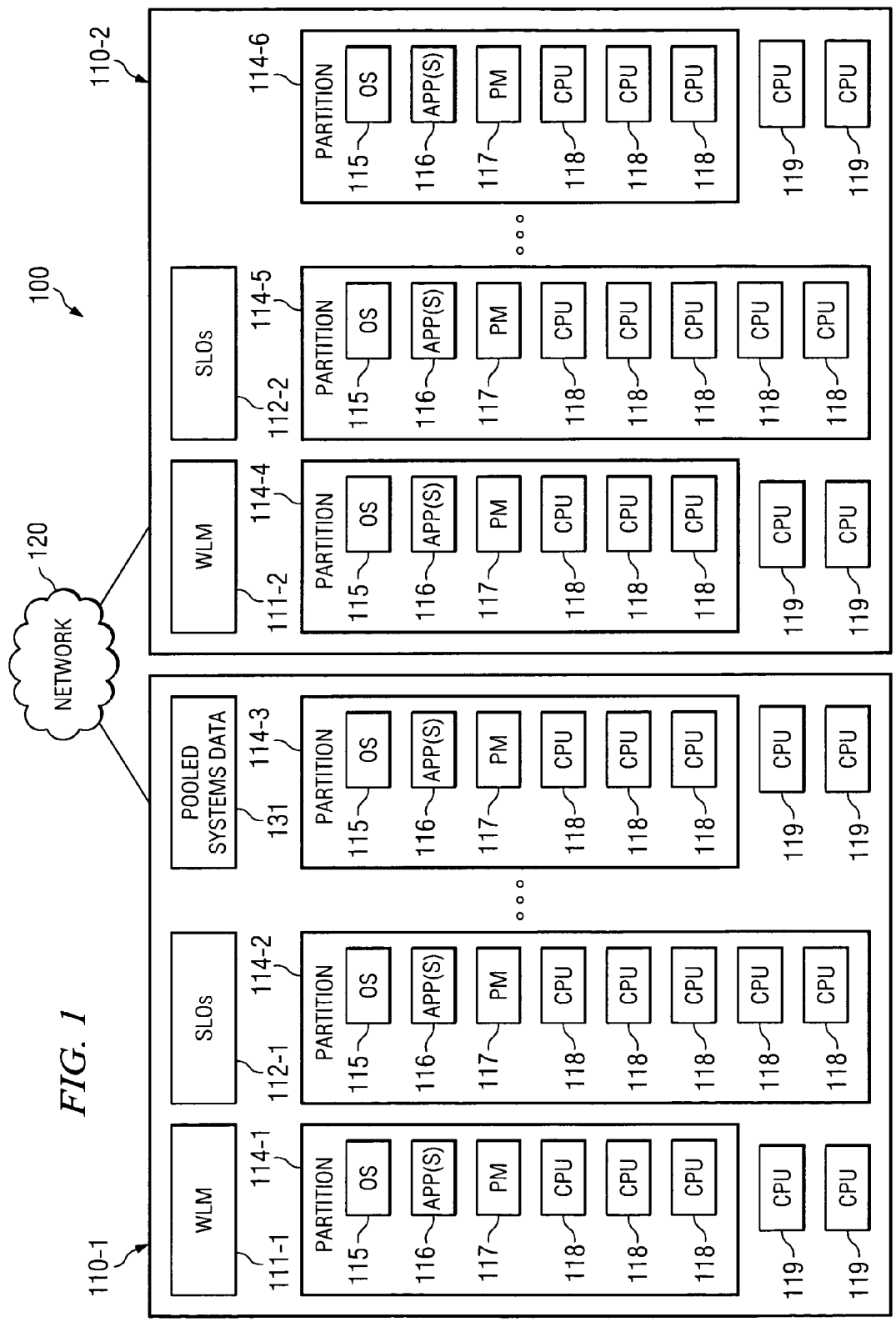
FIG. 1 depicts a system that employs workload management over multiple servers using iCAP processors according to one representative embodiment.

Referring now to the drawings, FIG. 1 depicts system 100 according to one representative embodiment. System 100 includes a plurality of server platforms (shown as 110-1 and 110-2). Each server platform 110 includes partitions (shown as 114-1 through 114-6) to support various workloads. As used herein, a partition is a physical or logical mechanism for isolating operational environments within a single server or multiple servers. The partitions can be hardware partitions such as nPar partitions available from Hewlett-Packard Company. nPar hardware partitions include a number of physical elements that provide electrical isolation (e.g., to limit read and write transactions) between partitions. For the sake of present discussion, it is assumed that the partitions 114 are virtual partitions such as vPars available from Hewlett-Packard Company. Virtual partitions are typically implemented by providing isolation functionality within an operating system.

Server platforms 110 include a number of active processors 118 and inactive processors 119 that are managed according to iCAP purchasing. When the system administrator wishes to add additional capacity to one of the server platforms 110, the administrator may activate a previously inactive processor 119 using suitable commands via the operating system. The activated processor may then be used to support software operations of the server platform 110. Activation and deactivation of processors may be recorded for reconciliation, billing, and other suitable purposes.

Additionally, pooled systems data 131 (a suitable data structure) identifies servers 110-1 and 110-2 as being collectively managed according to a single iCAP account. Pooled systems data 131 also identifies the number of total processors that the customer is entitled to activate, the number of currently active processors, and the number of inactive processors. Specifically, in such a pooled arrangement, the customer is entitled to activate a total number of processors across multiple systems in any distribution that the customer desires. The customer may activate and deactivate processors on the various platforms. As long as the total number of active processors 118 across all of the platforms is less than or equal to the licensed number of processors, the customer is not charged for activation operations. Pooled systems data 131 can be maintained by the "master" WLM software module 111 (shown as 111-1 in FIG. 1). The master WLM refers to the WLM software module that enforces the overall limitations and that allows reallocation of active iCAP processors between platforms.

The active processors 118 are allocated or otherwise assigned to partitions 114. The processors 118 are used to support the operating system 115 of the partition 114, a performance monitor software module 117, and workload applications 116. The performance monitor software module 117 monitors the operations of applications 116 and generates information indicative of the performance of the applications. In some embodiments, performance monitor (PM) software module 117 may monitor the utilization rate of CPUs 118. If the utilization rate exceeds a threshold value, it may be inferred that the performance of applications 116 has been adversely affected. Alternatively, performance monitor software module 117 may examine the length of time for one or several applications 116 to perform selected transactions. The length of time to respond to certain database queries could be monitored as an example. Performance monitor software module 117 uses the performance information to determine whether sufficient resources are available to support the desired level of performance. Performance monitor software module 117 similarly uses the performance information to identify when the respective partition 114 possesses excess resources given the workload demand of applications 116.

Depending upon the observed workload demand of applications 116, performance monitor software module 117 may communicate information requesting additional processing capacity to workload management (WLM) software module 111. Likewise, performance monitor software module 117 may communicate information indicating that processing capacity may be deallocated from partition 114 when excess resources are identified.

Workload management software module 111 arbitrates between the requests for additional resources associated with the various partitions 114. The arbitration is based upon service level objectives (SLOs) 112. SLOs 112 may be implemented to define the relative priorities of the various workloads of partitions 114. Additionally, SLOs 112 may be encoded in multiple tiers. Workload management software module 117 may select the processor distribution between partitions 114 that satisfies the highest tier defined in SLOs 112. Workload management software module 117 then reassigns active processors 118 according to the distribution defined by the highest obtainable tier of the SLOs 112. Additional information regarding managing workloads according to service level objectives may be found in U.S. patent Ser. No, 09/493,753, entitled "DYNAMIC MANAGEMENT OF COMPUTER WORKLOADS THROUGH SERVICE LEVEL OPTIMIZATION," which is incorporated herein by reference.

Workload management software modules 111-1 and 111-2 are also configured to coordinate allocation operations. Workload management software modules 111-1 and 111-2 communicate via network 120 as shown in FIG. 1. When one platform 110 possesses excess processor capacity and the other platform 110 does not possess sufficient processor capacity to meet the current workload demand, workload management software modules 111-1 and 111-2 shift resources between platforms 110. For example, it is assumed that the workload demand associated with the applications 116 of platform 110-1 is relatively low. Accordingly, fewer active processors 118 can be used to support the workload demand without affecting application performance. Also, assume that the workload demand associated with the applications 116 of platform 110-2 is relatively high. The performance of the applications 116 would be improved if additional processors were used to support the applications 116.

In such a circumstance, workload management software module 111-2 communicates a request to workload management software module 111-1 to obtain processor resources. Because platform 110 possesses excess resources, workload management software module 111-1 deallocates unused or otherwise underutilized active processors 118 from one or several partitions 114. Workload management software module 111-1 deactivates the deallocated processors 118. Workload management software module 111-1 communicates a reply message to workload management software module 111-2 indicating that a number of processors have been deactivated. Workload software module 111-2 then activates the same number of inactive iCAP processors 119. Workload management software module 111-2 then allocates the newly activated processors to one or several partitions 114. The respective applications 116 then experience an increase in performance due to the presence of additional processor capacity to support the workload demand. Additionally, because the total number of active iCAP processors remains constant as reflected in pooled systems data 131, the customer is not charged for the newly activated processors.

Figure 2:
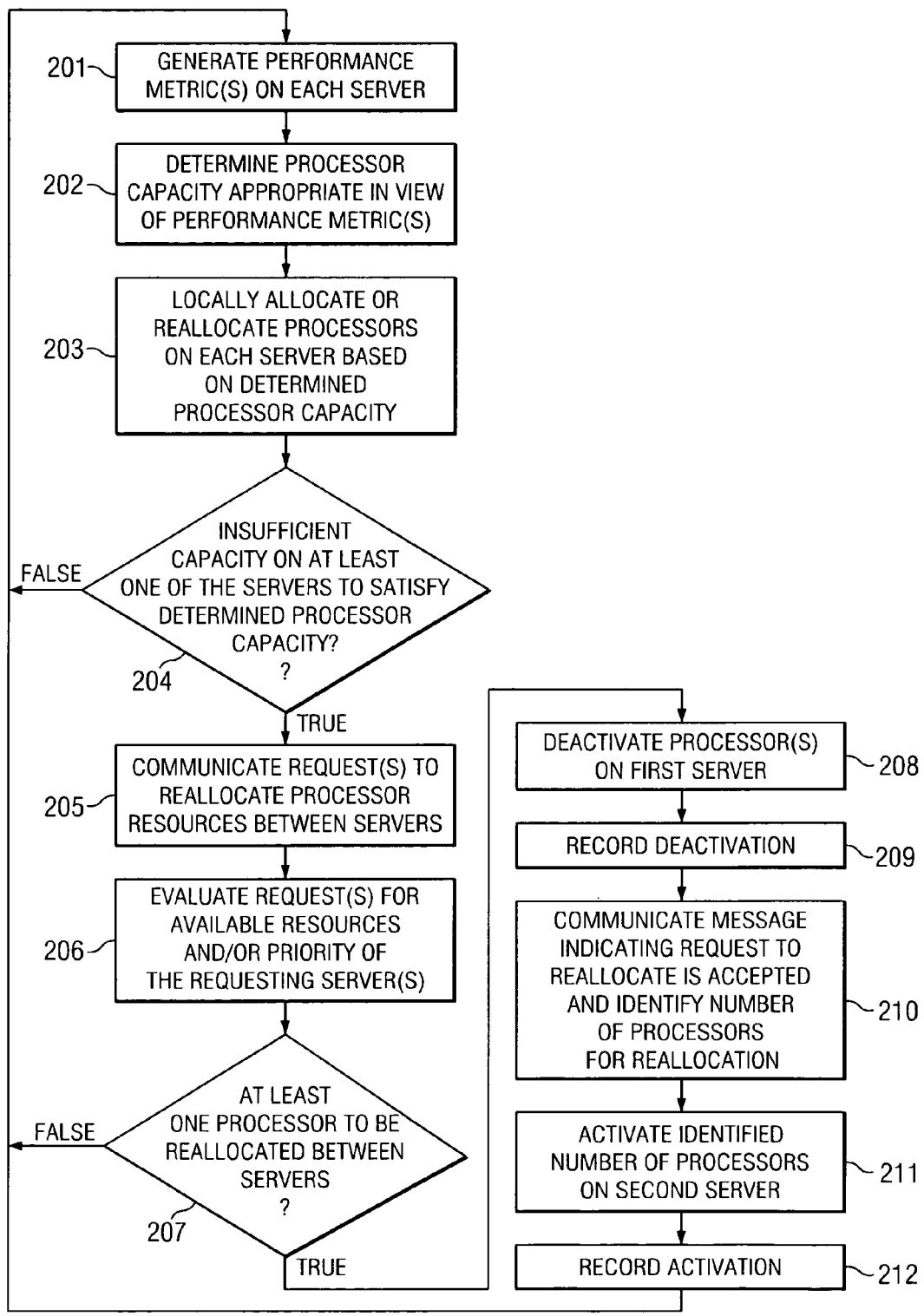
FIG. 2 depicts a flowchart according to one representative embodiment.

FIG. 2 depicts a flowchart for workload management across multiple servers according to one representative embodiment. FIG. 2 may be implemented using executable code or software instructions. The code can be retrieved from any suitable computer readable medium. The code can be implemented within the operating system of a server. Additionally, the code can be implemented in a distributed manner. Specifically, certain portions of the code are executed in parallel on different servers in some embodiments.

In block 201, performance metrics are generated on each server. The performance metrics are indicative of the workload demand of various applications. For example, the performance metrics can include processor utilization rates. Additionally or alternatively, the performance metrics can identify the number of outstanding transactions for a particular application. The performance metrics can identify the length of time to perform certain transactions (e.g., selected database queries) as another option.

In block 202, the processor capacity appropriate in view of the generated performance metrics is determined for each workload on each server. For example, a service level objective could be defined where a desired SLO of an application is to maintain the processor utilization rate below a predetermined level. The actual utilization rate can be compared to the desired utilization rate and used in conjunction with the number of currently allocated processors to calculate the appropriate number of processors to achieve the desired SLO.

In block 203, processors are allocated or reallocated on each server based upon the processor capacities determined for each server. Specifically, on each server, inactive or underutilized processors can be reallocated between partitions.

In block 204, a logical comparison is made to determine whether there is insufficient capacity on at least one of the servers to satisfy the determined processor capacity. If no server has insufficient capacity, the process flow returns to block 201. Otherwise, the process flow proceeds to block 205.

In block 205, one or several requests are communicated to the master server for the reallocation of processor resources.

In block 206, the requests are evaluated by the WLM software module of the master server. Specifically, in some embodiments, the master server receives all of the requests and arbitrates between the requests according to an appropriate scheme (e.g., weighted priorities). For example, the master server may determine whether a non-requesting server possesses excess capacity before allowing reallocation of active iCAP processors. Also, if the there is no excess capacity, the master server can determine whether there is a server of "lower" priority than the requesting server. If so, the request for reallocation is appropriate even though the lower priority server does not possess underutilized processors.

In block 207, a logical comparison is made to determine whether at least one processor will be reallocated between servers according to the evaluation of the request(s). If not, the process flow returns to step 201. Otherwise, the process flow proceeds to block 208.

In block 208, one or several processors are deactivated on a first server according to iCAP operations. In block 209, the deactivation is communicated to the master server and recorded (e.g., in pooled systems data 131 of FIG. 1). In block 210, a message is communicated indicating acceptance of the request and identifying the number of processors for reallocation. In block 211, the identified number of iCAP processors are activated on the second server. In block 212, the activation is communicated to the master server and recorded. Because the two servers are associated with the same iCAP account, the activation of the iCAP processors does not cause the customer to incur additional expense. Moreover, the customer is able to more efficiently use processing resources, because processors are shifted to more demanding or higher priority workloads.

What is claimed is:

1. A method for workload management using instant capacity (iCAP) processors, comprising:

generating performance data related to workloads on multiple servers, which have a total number of currently licensed iCAP processors that are currently licensed to a customer and are configured to use additional iCAP processors beyond said currently licensed iCAP processors;

determining processor resources appropriate for said workloads using said performance data;

communicating a request from a first server to reallocate processor resources in response to said determining;

satisfying said request without requiring an additional iCAP processor beyond said currently licensed iCAP processors by deactivating at least one iCAP processor on a second server in response to said request; and activating at least one iCAP processor on said first server in conjunction with said deactivating, wherein said first server and said second server are different physical machines.

2. The method of claim 1 further comprising:

comparing a relative priority of said first server to said second server before performing said deactivating and said activating.

3. The method of claim 1 further comprising:

determining whether underutilized iCAP processors are present on said second server before performing said deactivating and activating.

4. The method of claim 1 further comprising:
recording the deactivation of said iCAP processor on said second server.

5. The method of claim 1 further comprising:
recording the activation of said iCAP processor on said first server.

6. The method of claim 5 wherein said first server and said second server are identified as belonging to a common iCAP account in a data structure maintained by a master server of said first and second servers.

7. The method of claim 1 further comprising:
assigning said activated iCAP processor to a partition.

8. The method of claim 1 wherein said request is communicated to a master server that directs said second server to perform said deactivating and directs said first server to perform said activating.

9. A system for multiple server workload management, wherein multiple servers of said system comprise:
a plurality of instant capacity (iCAP) processors, which are a total number of iCAP processors currently licensed to said system that is configured to use additional iCAP processors beyond said currently licensed iCAP processors; and
a workload management (WLM) software module for allocating processors between workloads, without requiring an additional iCAP processor beyond said currently licensed iCAP processors, according to data indicative of performance of said workloads, wherein said WLM software module is configured to (i) request additional processor capacity from a master WLM software module when said WLM software module determines that insufficient processor capacity is available using said performance data; (ii) deactivate one or several iCAP processors associated with a first physical machine in response to messages from said master WLM software module; and (iii) activate one or several iCAP processors associated with a second physical machine after receiving a reply message in response to said request for additional processor capacity, wherein said first physical machine and said second physical machine are separate physical machines.

10. The system of claim 9 wherein each WLM software module is configured to identify underutilized iCAP processors.

11. The system of claim 9 wherein a master WLM software module is configured to compare a relative priority of a first server requesting additional processor capacity before directing deactivation of iCAP processors on a second server.

12. The system of claim 9 wherein said master WLM software module records activation and deactivation of iCAP processors on said multiple servers.

13. The system of claim 9 wherein each WLM software module reallocates processors between partitions in response to said performance data.

14. The system of claim 9 wherein said master server arbitrates between requests from said multiple servers.

15. A non-transitory computer readable medium having instructions stored thereon that when executed cause a computer system to perform a method for workload management using instant capacity (iCAP) processors, the instructions comprising:
code for generating performance data related to workloads on a local server;
code for determining processor resources appropriate for said workloads using said performance data;
code for communicating a request to another server to obtain additional processor resources in response to said determining;
code for satisfying said request without requiring an additional iCAP processor beyond iCAP processors currently licensed for said local server and said another server, which are configured to use additional iCAP processors beyond said currently licensed iCAP processors, by
deactivating at least one instant capacity (iCAP) processor in response to a deactivation message from said another server; and
activating at least one iCAP processor on said local server after receiving a reply message in response to said request, wherein said local server and said another server are different physical machines.

16. The non-transitory computer readable medium of claim 15 further comprising:
code for communicating a message indicating deactivation of an iCAP processor.

17. The non-transitory computer readable medium of claim 15 further comprising:
code for communicating a message indicating activation of an iCAP processor.

18. The non-transitory computer readable medium of claim 15 further comprising:
code for assigning an activated iCAP processor to a partition.

19. The non-transitory computer readable medium of claim 15 wherein said another server is a master server that receives requests for additional processors resources from multiple servers.

* * * * *